Patented Jan. 15, 1974

3,786,082
SYNTHESIS OF ETHYL 4-HALOACETOACETATES
Neil W. Connon, Rochester, N.Y., assignor to Eastman Kodak Company, Rochester, N.Y.
No Drawing. Filed Oct. 24, 1972, Ser. No. 301,576
Int. Cl. C07c 67/00, 69/72
U.S. Cl. 260—483          6 Claims

ABSTRACT OF THE DISCLOSURE

Ethyl 4-haloacetoacetates are synthesized by a modified Reformatsky reaction of an ethyl haloacetate with magnesium in a chlorinated hydrocarbon solvent, comprising steps of:
(a) reacting magnesium and ethyl haloacetate at reflux in a chlorinated hydrocarbon solvent selected from the group consisting of chloroform and dichloromethane to form a magnesium enolate complex and solvent mixture;
(b) diluting said mixture with water to precipitate said magnesium enolate complex;
(c) washing said magnesium enolate complex with water;
(d) mixing said washed magnesium enolate complex and a quantity of the same chlorinated hydrocarbon solvent and acidifying said mixture with sulfuric acid at a temperature below about 30° C. to hydrolize said complex to form said ethyl 4-haloacetoacetate; and
(e) recovering said ethyl 4-haloacetoacetate.

FIELD OF THE INVENTION

This invention relates to the synthesis of organic compounds and more particularly to the synthesis of haloacetoacetates.

BACKGROUND OF THE INVENTION

Ethyl 4-chloroacetoacetate has been prepared by the reaction of ethyl chloroacetate with magnesium using ethyl ether as the solvent and followed by hydrolysis. See, for example, Hamel, Bull. Soc. Chem., [4] 29, 390 (1921). Such a procedure produced low yields of around 56% and involved the inherent dangers normally associated with using such a highly volatile, flammable solvent. Initially, it was assumed that this reaction was Grignard in character to the extent that it required a donor solvent such as an ether.

It has now been found that the reaction is a modified Reformatsky reaction rather than a Grignard reaction. The Reformatsky reaction is generally the reaction between an α-haloester, usually an α-bromoester, and an aldehyde or ketone in the presence of zinc. This reaction proceeds as follows:

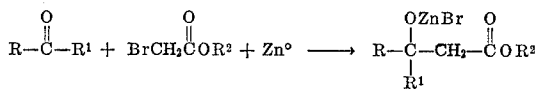

However, the reaction may be modified by using an ester in place of an aldehyde or ketone to give, after hydrolysis or spontaneous decomposition, a β-ketoester, as for example by the following reaction:

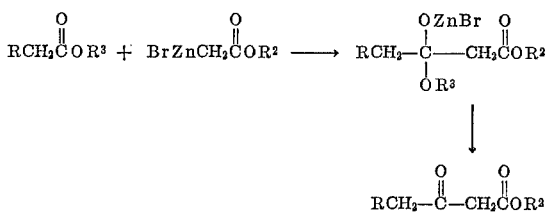

The ester can be the same one that was used to prepare the organo-zinc bromide which forms in the above-described modified Reformatsky reaction.

As indicated above, magnesium has been substituted for zinc as a further modification of the Reformatsky reaction using ethyl chloroacetate as a reactant. However, distillation is usually required to purify the final product. Such a distillation step, even at reduced pressures, requires a temperature which may decompose some of the ethyl 4-haloester product, thereby reducing the yield and increasing the cost of the product.

SUMMARY OF THE INVENTION

It is therefore an object of this invention to provide an improved process for the synthesis of ethyl 4-haloacetoacetates. A further object of this invention is to provide a process for synthesizing ethyl 4-chloroacetoacetate. It is yet another object of this invention to provide a process for synthesizing ethyl 4-chloroacetoacetate with the necessity of distillation to purify the product.

These and other objects and advantages are obtained by reacting an ethyl haloacetate with magnesium in a chlorinated hydrocarbon solvent. The ethyl 4-haloacetoacetates are useful in the preparation of thiazoline thiones, which compounds are useful as stable sources of silver for physical photographic development, see U.S. Pat. 3,647,439. The process consists of the following steps: (1) reaction of magnesium and ethyl haloacetate in a chlorinated hydrocarbon solvent to form a magnesium enolate complex, (2) addition of an alcohol such as methanol to destroy the unreacted traces of magnesium, (3) removal of the magnesium enolate complex as a precipitated salt, (4) washing the magnesium enolate complex with water to remove impurities, (5) mixing the magnesium enolate complex and the chlorinated hydrocarbon solvent with the addition of sulfuric acid to hydrolize the magnesium enolate complex, and (6) separating the ethyl 4-haloacetoacetate product layer.

DETAILED DESCRIPTION OF THE PREFERRED EMBODIMENTS

The successful preparation of ethyl 4-haloacetoacetates by the modified Reformatsky reaction of an ethyl haloacetate with magnesium is dependent upon the presence of a solvent. Various chlorinated hydrocarbon solvents may be used. Dependent upon the particular haloacetoacetate that is to be prepared, certain solvents are preferred. When preparing ethyl 4-bromoacetoacetate, it has been found that chloroform is the preferred solvent. When ethyl 4-chloroacetoacetate is to be prepared, which is the preferred compound, it has been found that dichloromethane is the preferred solvent. Other solvents such as dichloroethane and tetrahydrofuran may be used with both the bromo and chloro acetates but with less favorable results.

The first step in the preparation of ethyl 4-haloacetoacetates is the reaction of magnesium and an ethyl haloacetate in a chlorinated hydrocarbon solvent. This may be accomplished by placing about two-thirds mole of magnesium for each mole of ethyl haloacetate that will be used into a reaction pot with the desired amount of the appropriate chlorinated hydrocarbon solvent. Usually in an average mixture, about 3 to 3.1 moles of ethyl haloacetate will be reacted with about 2 to 2.4 moles of magnesium in about 200 to 400 ml. of chlorinated solvent. The magnesium-solvent mixture is stirred at reflux for about 5 to 45 minutes and then 5–15% of the chlorinated solvent may be removed by distillation.

In a separate reaction flask are placed about 1 to 3 percent of the amount of magnesium calculated for the reaction, about 1 to 10 ml. of ethyl haloacetate and a small amount (5–50 ml.) of an activating solvent such as tetrahydrofuran. After mixing, if the reaction has not yet initiated, the mixture may be heated until the reaction starts. This may require heating to a temperature of between 40 and 70° C.

After initiation of the reaction, a small amount (about 1 to about 5 ml.) of ethyl haloacetate is added at a controlled rate to the magnesium, ethyl haloacetate, tetrahydrofuran reaction mixture. Cooling may be required. After discarding the liquors from this mixture, it is added to the main reaction mixture. A catalyst, such as iodine, may also be added in an amount of about 0.5 to about 1.5 weight percent.

The remaining amount of the ethyl haloacetate is now added in stages to maintain the reaction at a controlled rate which preferably is at a brisk reflux. The reaction mixture is now diluted with additional solvent. This generally amounts to about two liters for every ten moles of haloacetate reactant. After one to three hours of refluxing, the mixture is cooled to room temperature and concentrated under vacuum to a paste. About 50 to 300 ml. of methanol or other alcohol per mole of ethyl haloacetate is added to the paste with cooling as there is initially quite a vigorous reaction that occurs between the methanol and traces of unreacted magnesium. The mixture is then refluxed for 10 to 60 minutes and concentrated to about half volume.

The next step is the precipitation of the magnesium enolate salt. This is accomplished by adding the mixture to about 0.5 to about 2 liters of water per mole of ethyl haloacetate reactant. The water should be added to the reaction mixure since adding the mixture to water results in a sticky product which cannot be readily stirred. If an appreciable amount of chlorinated hydrocarbon solvent is present, the addition of water will result in a thick mush which is difficult to stir until the water content is increased. The magnesium enolate salt is then allowed to precipitate, and the mother liquid is drawn off. The salt is washed well with water and repeatedly washed with ligroine until the liquors are colorless.

The wet, white enolate salt is mixed with about 100 to about 200 ml. chlorinated hydrocarbon solvent, such as dichloromethane, per mole of haloacetate reactant; and to this mixture is added with stirring about 10 to about 20 ml. of a solution of concentrated sulfuric acid diluted with about 100 to about 200 ml. water. The temperature is kept below about 30° C. This mixing with solvent and acid hydrolizes the magnesium enolate salt to form the ethyl 4-haloacetoacetate. The organic layer is then separated, washed with water, and washed with a saturated sodium bicarbonate solution until neutral and again with water. The mixture is then concentrated under vacuum to an oil, diluted with benzene, and reconcentrated up to 50° C. until the final product remains.

Reference may be had to the following examples which further illustrate the preparation of ethyl 4-haloacetoacetates.

Example I

In a 5 liter flask fitted with a stirrer, condenser, and distillation head are placed 800 ml. of dichloromethane and 166.8 g. of magnesium turnings [98% of 170.2 g. (7 moles)]. This is stirred at reflux for 30 minutes and then 100 ml. of solvent is removed by distillation. In a separate flask are placed 3.4 g. of magnesium turnings (2% of 7 moles), 20 ml. of tetrahydrofuran and 1 ml. of ethyl chloroacetate. This is heated to 55° C. to initiate the reaction and then an additional 4 ml. of ethyl chloroacetate is added at 60° C. with cooling. Following this, the liquors are discarded and the activated magnesium is added to the main reaction mixture, along with about 1 g. of iodine.

Approximately 2% (25.7 g.) of the total 1287 g. (10.5 moles) of ethyl chloroacetate is added to the reaction flask, and then the total system is refluxed under two condensers until the reaction is initiated. When the vigorous reaction has subsided, approximately 100 g. more of ethyl chloroacetate is added at such a rate as to maintain a brisk reflux. At this point the reaction mixture is diluted with 2.0 liters of dichloromethane. The mixture is brought to reflux and the bulk of the ethyl chloroacetate is added with cooling. The final mixture is then refluxed for 1 hour and cooled to 25° C.

The mixture is concentrated under vacuum to a paste, and then 1.0 liter of methanol is carefully added with cooling. The mixture is refluxed for 30 minutes and then concentrated to half volume. With good stirring the mixture is diluted with 6-7 liters of cold water. The precipitated salt is collected, washed well with water, and drawn tight under rubber dam. It is then washed well with ligroine until the liquors are colorless.

The wet, white salt is placed in a 5 liter flask along with 1.0 liter of dichloromethane. A solution prepared from 200 ml. of $H_2SO_4$ diluted to 2.0 liters with water is slowly added with stirring, keeping the temperature below 30° C. The final mixture is stirred for 30 minutes and then the lower product layer is separated, washed with water, then with saturated sodium bicarbonate solution until neutral, and again with water. The mixture is concentrated under vacuum to an oil, diluted with 1.0 liter of benzene, and reconcentrated up to 50° C.

The yield of ethyl 4-chloroacetoacetate is 441 g., or 76.5% of the theoretical 576 g.

Example II

In a 1 liter 3-necked flask equipped with a dropping funnel, sweep stirrer, and 2 condensers is placed 250 ml. of chloroform and 34 g. of magnesium turnings. The mixture is stirred and heated at reflux for 30 minutes. In a second flask is placed 1 g. of magnesium, 10 ml. of tetrahydrofuran, and 1 ml. of ethyl chloroacetate. The mixture is heated to 60° C. and 4 ml. of ethyl chloroacetate is added to activate the magnesium. The liquors are decanted and the magnesium is added to the main flask with 0.5 g. of iodine. From the dropping funnel 245 g. (2 moles) of ethyl chloroacetate is added dropwise maintaining a brisk reflux. The mixture is refluxed one hour, cooled, and concentrated to an oil.

To the oil 500 ml. of methanol is slowly added to destroy the excess magnesium. The mixture is refluxed one-half hour, concentrated to one-third volume, and diluted with 3.5 liters of water. The solid is collected and washed with ligroine. The salt is slurried in 300 ml. of chloroform and acidified with 23 ml. of sulfuric acid diluted to 200 ml. with water. The temperature is kept below 30° C. The mixture is stirred 15 minutes and the dark bottom layer is removed, washed with water and a bicarbonate solution until neutral or slightly basic. The product is dried by azeotroping with benzene.

The yield of ethyl 4-chloroacetoacetate is 21 g. which is 19% of the theoretical amount of 110 g.

Example III

Ethyl 4-chloroacetoacetate was prepared as described in Example 1 except that 1,2-dichloroethane was used as the solvent and the yield of ethyl 4-chloroacetoacetate was 4%.

Example IV

Ethyl 4-bromoacetoacetate was prepared as described in Example I using ethyl bromoacetate as the reactant. The reaction was carried out in chloroform as in Example I and the yield of ethyl 4-bromoacetoacetate was 36%.

Example V

Ethyl 4-bromoacetoacetate was prepared as described in Example IV except that dichloromethane was used as the solvent and the yield of ethyl 4-bromoacetoactate was 5%.

Attempts to synthesize ethyl 4-bromoacetoacetate using 1,2-dichloroethane as the solvent gave no detectable yield.

Extension of the synthesis with the use of ethyl 2-bromopropionate was unsuccessful in either dichloromethane or chloroform.

It can be seen from the foregoing that ethyl haloacetoacetates may be prepared in good yields by the process of this invention.

The invention has been described in detail with particular reference to preferred embodiments thereof, but it will be understood that variations and modifications can be effected within the spirit and scope of the invention.

I claim:

1. A method of synthesizing ethyl 4-haloacetoacetates comprising the steps of:
   (a) reacting magnesium and an ethyl haloacetate at reflux in a chlorinated hydrocarbon solvent selected from the group consisting of chloroform and dichloromethane to form a magnesium enolate complex and solvent mixture;
   (b) diluting said mixture with water to precipitate said magnesium enolate complex;
   (c) washing said magnesium enolate complex with water;
   (d) mixing said washed magnesium enolate complex and a quantity of the same chlorinated hydrocarbon solvent and acidifying said mixture with sulfuric acid at a temperature below about 30° C. to hydrolize said complex to form said ethyl 4-haloacetoacetate; and
   (e) recovering said ethyl 4-haloacetoacetate.

2. A method according to claim 1 wherein said ethyl 4-haloacetoacetate is ethyl 4-chloracetoacetate and said ethyl haloacetate is ethyl chloroacetate.

3. A method according to claim 2 wherein said solvent is dichloromethane.

4. A method according to claim 1 wherein said ethyl 4-haloacetoacetate is ethyl 4-bromoacetoacetate and said ethyl haloacetate is ethyl bromoacetate.

5. A method according to claim 4 wherein said solvent is chloroform.

6. A method according to claim 1 including the step of adding methanol to said magnesium enolate complex and heating to reflux to remove unreacted traces of magnesium before step (b).

References Cited

Hamel, Bull. Soc. Chem., [4] 29, 390 (1921).

VIVIAN GARNER, Primary Examiner

U.S. Cl. X.R.

260—484